(12) United States Patent
Zenno

(10) Patent No.: US 8,090,510 B2
(45) Date of Patent: Jan. 3, 2012

(54) DEVICE AND METHOD FOR CONTROLLING TRANSMISSION MECHANISM, AND METHOD FOR CONTROLLING MOTOR VEHICLE

(75) Inventor: Toru Zenno, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 461 days.

(21) Appl. No.: 12/424,337

(22) Filed: Apr. 15, 2009

(65) Prior Publication Data
US 2009/0292429 A1 Nov. 26, 2009

(30) Foreign Application Priority Data

May 20, 2008 (JP) ................... 2008-132191

(51) Int. Cl.
*G06F 17/00* (2006.01)

(52) U.S. Cl. ............................................ 701/56

(58) Field of Classification Search .......... 701/51, 701/55, 56, 64, 67; 180/374
See application file for complete search history.

(56) References Cited

U.S. PATENT DOCUMENTS

| 5,624,351 | A | 4/1997 | Fujita et al. | |
|---|---|---|---|---|
| 5,816,100 | A | 10/1998 | Fowler et al. | |
| 6,679,133 | B1 * | 1/2004 | Kayano et al. | 74/335 |
| 6,889,570 | B2 * | 5/2005 | Kayano et al. | 74/339 |
| 7,367,923 | B2 * | 5/2008 | Zenno et al. | 477/180 |
| 2010/0105522 | A1 * | 4/2010 | Hagelskamp | 477/138 |

FOREIGN PATENT DOCUMENTS

| EP | 1 669 625 A2 | 6/2006 |
|---|---|---|
| JP | 2006-170229 | 6/2006 |
| JP | 2009264519 A * | 11/2009 |

OTHER PUBLICATIONS

An European Search Report dated Oct. 19, 2011 issued to EP 09 25 1317.

* cited by examiner

*Primary Examiner* — Faye M. Fleming
(74) *Attorney, Agent, or Firm* — Dickstein Shapiro LLP

(57) ABSTRACT

In a motor vehicle having a clutch and a transmission, an additional shift command is accepted during an already ongoing shift operation, thereby providing control that makes possible a responsive shift operation. When a shift command is issued during an ongoing shift operation and engagement operation of the clutch, the disengagement operation of the clutch and the dog insert operation of the transmission are conducted according a second schedule so that the dog insert operation of the transmission is conducted during the disengagement operation of the clutch, and a second shift operation including the re-engagement of the clutch is conducted.

25 Claims, 11 Drawing Sheets

DEVICE AND METHOD FOR CONTROLLING TRANSMISSION MECHANISM, AND METHOD FOR CONTROLLING MOTOR VEHICLE

PRIORITY INFORMATION

This patent application is based on and claims priority under 35 U.S.C. §119 to Japanese Patent Application No. 2008-132191, filed on May 20, 2008, which is hereby incorporated by reference.

TECHNICAL FIELD

The present invention relates to a device and a method for controlling a transmission mechanism of a motor vehicle, and to a motor vehicle. In particular, the present invention relates to control exercised when engaging a clutch in a motor vehicle having a clutch and a dog clutch transmission.

BACKGROUND

A motor vehicle having a dog clutch transmission in which a clutch and a transmission are actuated by actuators such as motors has already become practically available. Such a motor vehicle is primarily characterized by automatically performing a series of shift operations including disengaging of the clutch, shifting of gears, and re-engaging of the clutch, when a rider inputs a shift command.

Japanese Unexamined Patent Application Publication No. 2006-170229 (hereinafter "Japanese '229 application") discloses a motor vehicle with a dog clutch transmission, wherein a clutch and a transmission are actuated by actuators such as motors. When a shift command is input while control in accordance with a running state program is being exercised in the motor vehicle disclosed in the Japanese '229 application, the following steps are executed: activating the clutch actuator so as to disengage the clutch once; activating the shift actuator so as to upshift the transmission; switching to upshift control, in which the clutch actuator is activated so as to re-engage the clutch; and then switching to control in accordance with a running state program when the upshift control is finished.

In the motor vehicle disclosed in the Japanese '229 application, after the upshift control is finished and before the control is switched to control performed in accordance with a running state program, a rider may input an additional shift command at that timing, feeling that the shift operation has already finished. When the shift command is not carried out in this case, the rider may feel uncomfortable and feel that the motorcycle is unresponsive.

The present invention has been achieved against such a background. An object of the present invention is to provide control that makes possible a shifting operation having a good response by accepting an additional shift command during a shift operation of a motorcycle having a clutch and a dog clutch transmission.

SUMMARY

In order to achieve the object, in one embodiment of a device for controlling a transmission mechanism for a motor vehicle according to the present invention, the transmission mechanism includes a transmission having a clutch, gears each having a dog, and gears each having a recess into which the dog is inserted, the clutch and the gears being actuated by respective actuators, wherein a shift operation is conducted by conducting a dog insert operation in which a specified one of the dogs is inserted into a specified one of the recesses, and the device includes a shift command receiving unit for receiving a shift command; a shift control unit for conducting disengagement and engagement operations of the clutch and the shift operation including the dog insert operation of the transmission in accordance with the shift command; and a shift command timing determining unit for determining timing at which the shift command was issued, wherein, when the shift command timing determining unit determines that the shift command was issued at a timing at which the shift operation was not being conducted, the shift control unit conducts a first shift operation in which the disengagement operation of the clutch and the dog insert operation of the transmission are conducted in accordance with a first schedule and then the engagement operation of the clutch is conducted, and wherein, when the shift command timing determining unit determines that the shift command was issued at a timing at which the shift operation and the engagement operation of the clutch were being conducted, the shift control unit interrupts the engagement operation of the clutch and conducts a second shift operation in which the disengagement operation of the clutch and the dog insert operation of the transmission are conducted in accordance with a second schedule that is different from the first schedule and then the engagement operation of the clutch is conducted.

In one method for controlling a transmission mechanism of a motor vehicle according to the present invention, the transmission mechanism includes a transmission having a clutch, gears each having a dog, and gears each having a recess into which the dog is inserted, the clutch and the gears being actuated by respective actuators, wherein a shift operation is conducted by inserting a specified one of the dogs into a specified one of the recesses, and the method includes a shift command receiving step for receiving a shift command; a shift control step for conducting disengagement and engagement operations of the clutch and the shift operation including the dog insert operation of the transmission in accordance with the shift command; and a shift command timing determining step for determining timing at which the shift command was issued, wherein, when it is determined at the shift command timing determining step that the shift command was issued at a timing at which the shift operation was not being conducted, a first shift operation in which the disengagement operation of the clutch and the dog insert operation of the transmission are conducted in accordance with a first schedule and then the engagement operation of the clutch is conducted in the shift control step, and wherein, when it is determined at the shift command timing determining step that the shift command was issued at a timing at which the shift operation and the engagement operation of the clutch were being conducted, the engagement operation of the clutch is interrupted and a second shift operation in which the disengagement operation of the clutch and the dog insert operation of the transmission are conducted in accordance with a second schedule that is different from the first schedule and then the engagement operation of the clutch is conducted in the shift control step.

In a further method for controlling a motor vehicle according to the present invention, the motor vehicle includes a transmission mechanism including a transmission having a clutch, gears each having a dog, and gears each having a recess into which the dog is inserted, the clutch and the gears being actuated by respective actuators, wherein a shift operation is conducted by inserting a specified one of the dogs into a specified one of the recesses, and the method includes a shift command receiving step for receiving a shift command; a shift control step for conducting disengagement and engagement operations of the clutch and the shift operation including the dog insert operation of the transmission in accordance with the shift command; and a shift command timing determining step for determining timing at which the shift command was issued, wherein, when it is determined at the shift command timing determining step that the shift command was issued at a timing at which the shift operation was not being conducted, a first shift operation in which the disengagement operation of the clutch and the dog insert operation of the transmission are conducted in accordance with a first schedule and then the engagement operation of the clutch is conducted in the shift control step, and wherein, when it is determined at the shift command timing determining step that the shift command was issued at a timing at which the shift operation and the engagement operation of the clutch were being conducted, the engagement operation of the clutch is interrupted and a second shift operation in which the disengagement operation of the clutch and the dog insert operation of the transmission are conducted in accordance with a second schedule that is different from the first schedule and then the engagement operation of the clutch is conducted in the shift control step.

With the device and the method for controlling the transmission mechanism and the method for controlling the motor vehicle according to the present invention, in a motor vehicle having a clutch and a dog clutch transmission actuated by an actuator such as a motor, an additional shift command can be accepted during a shift operation, thereby providing control that makes possible a responsive shift operation.

DETAILED DESCRIPTION

Hereinafter, various embodiments according to the present invention are described in detail with reference to the drawings. It is to be understood that other embodiments may be utilized and structural changes may be made.

Figure 1:
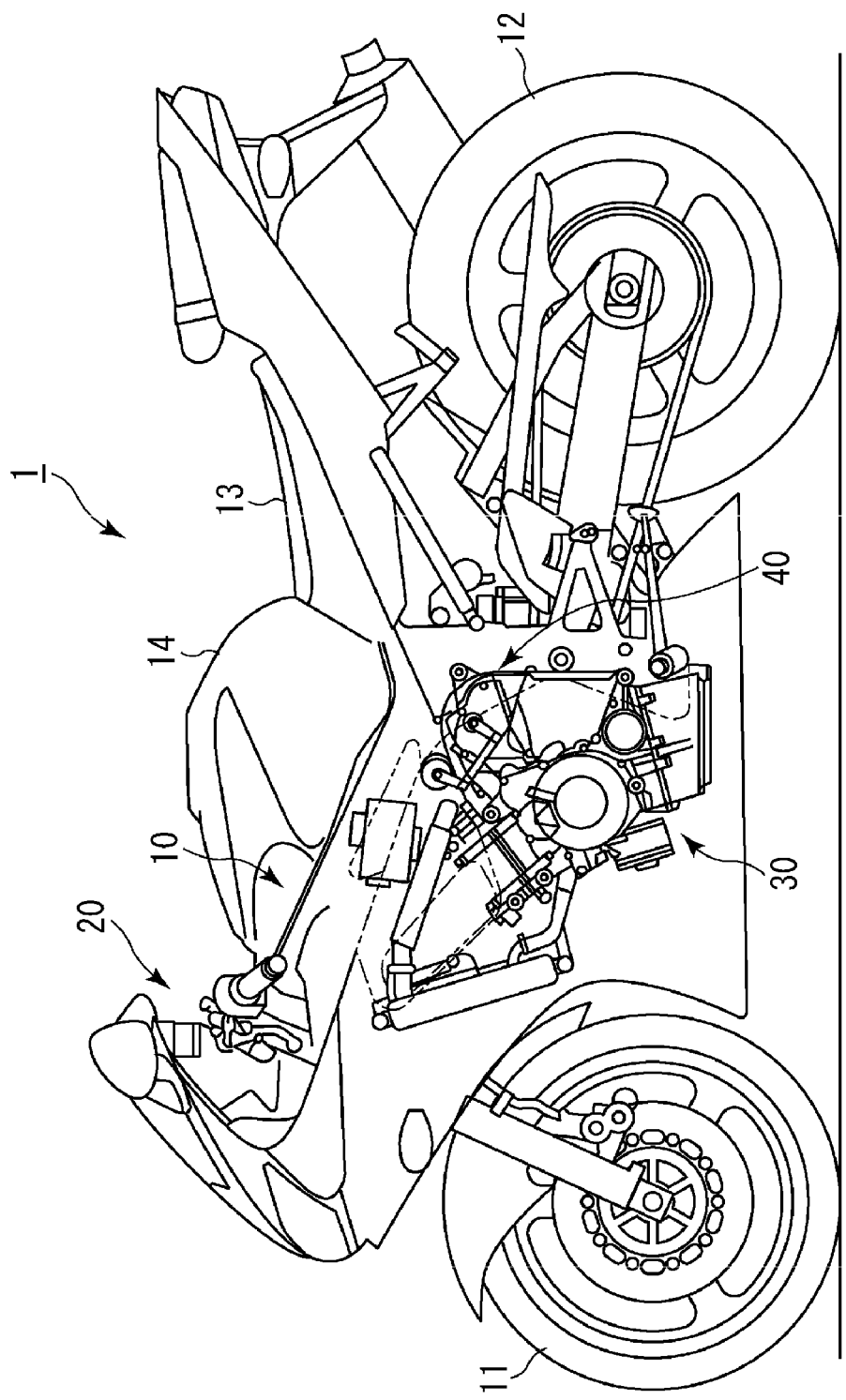
FIG. 1 illustrates an external side view of a motorcycle according to an embodiment of the present invention.

FIG. 1 illustrates an external side view of a motorcycle according to one embodiment of the present invention. As in any typical motorcycle, a motorcycle 1 shown in the FIG. 1 includes a body frame 10, a front wheel 11 that is a steering wheel, a rear wheel 12 that is a driving wheel, a seat 13 on which a rider sits, a fuel tank 14, handlebars 20, an engine 30, and a transmission mechanism 40. The motorcycle is described here as an example of a motor vehicle; however, the present invention is applicable to various vehicles such as an all-terrain vehicle (ATV), a three-wheeled or four-wheeled buggy, and a snowmobile.

Figure 2:
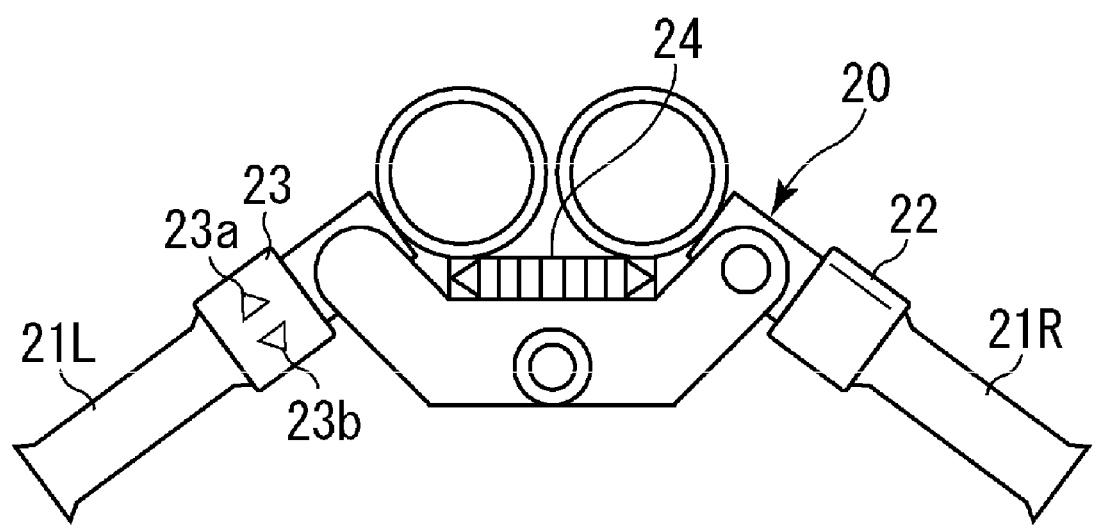
FIG. 2 illustrates a block diagram of handlebars.

FIG. 2 is a schematic view of the handlebars 20. A right grip 21R on the handlebars 20 shown in the figure is an accelerator grip. A rider can adjust the degree of the accelerator opening by twisting the right grip 21 R. While acceleration of the motorcycle 1 is preferably controlled by twisting the right grip 21R, it can be controlled by other acceleration input devices including throttle buttons or levers, pedals, or other acceleration input means without departing from the scope of the present invention.

An accelerator opening detector 22 attached to the right grip 21R detects the degree of accelerator opening adjusted by the rider. A shift switch 23 attached to a left grip 21L on the handlebars 20 serves as a shift command receiving unit. The shift switch 23 includes an upshift switch 23a and a downshift switch 23b. The rider can successively select a gear stage of the transmission mechanism 40 from neutral through to the top gear by manually operating the upshift switch 23a and the downshift switch 23b. The shift command receiving unit is not limited to the shift switch 23, and other input devices such as a shift pedal may be used.

An indicator 24 is preferably disposed at the center of the handlebars 20 so as to indicate the present gear stage; however, the indicator 24 can be disposed in any position where it can be easily viewed by a rider on the motorcycle 1.

Figure 3:
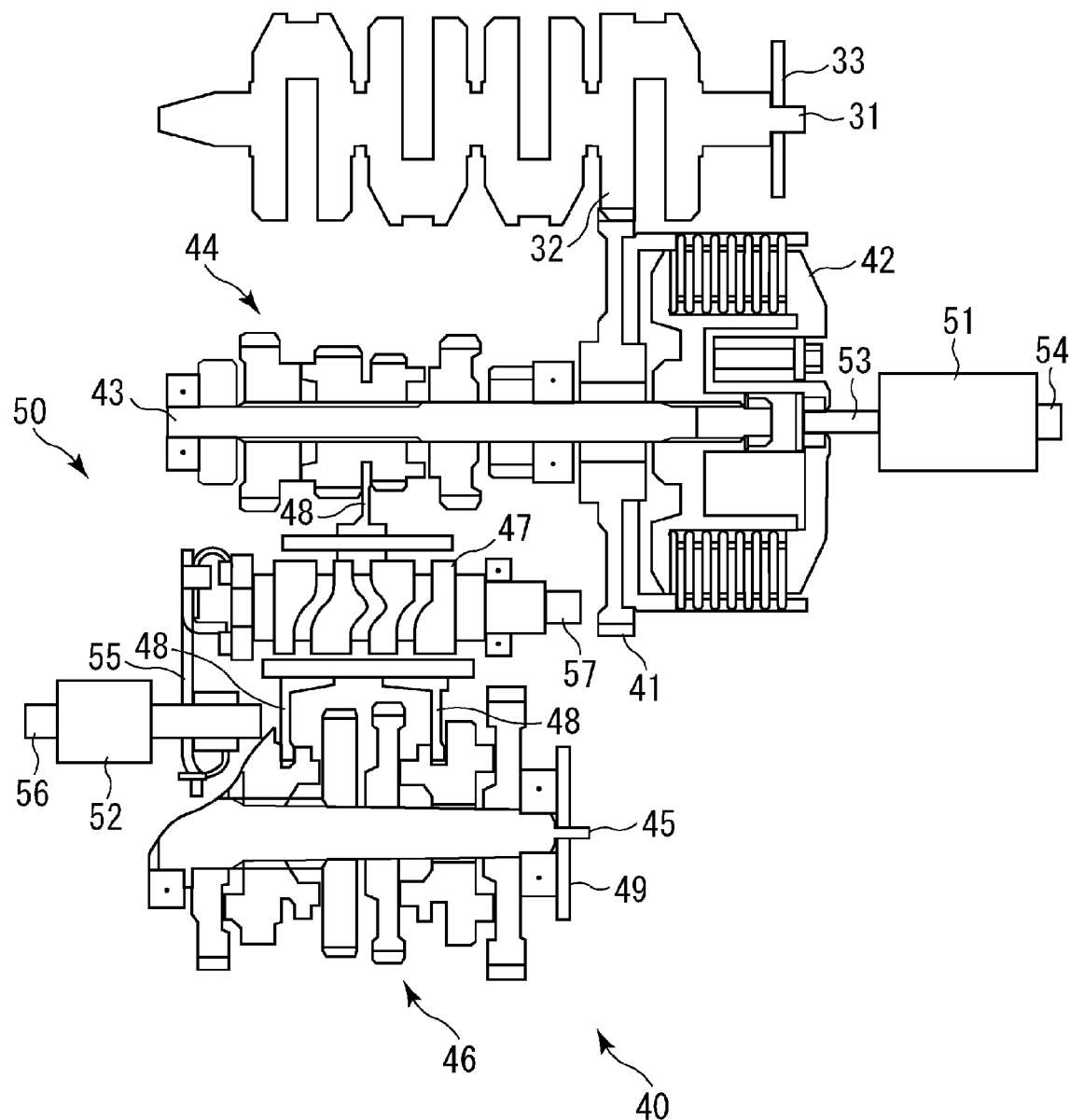
FIG. 3 is a schematic view illustrating a structure of a transmission mechanism.

FIG. 3 is a schematic view showing one embodiment of the transmission mechanism 40. Power generated by the engine 30 is transmitted through a primary drive gear 32 on a crankshaft 31 to a primary driven gear 41 in the transmission mechanism 40. An engine tachometer 33 is attached to an end of the crankshaft 31. The gear ratio of the primary drive gear 32 to the primary driven gear 41 is called the primary reduction ratio.

The power that is input to the primary driven gear 41 is transmitted to a main shaft 43 through a clutch 42. Although a wet multiple disc clutch is shown in FIG. 3, the clutch 42 is not limited to being of this type. Various known clutches such as a dry clutch and a single disc clutch may be preferably used. Transmission gears 44 for multiple gear stages are disposed on the main shaft 43. The transmission gears 44 mesh with transmission gears 46 disposed on a drive shaft 45. Although the transmission gears 44 and 46 are separated in FIG. 3, they mesh with each other in reality, as described above. The power is transmitted from the main shaft 43 to the drive shaft 45 through only a selected pair of the transmission gears 44 and 46, while the remaining transmission gears 44 and 46 rotate freely. The pair of transmission gears 44 and 46 that transmits the power is selected by rotating a shift cam 47 and thereby moving a shift fork 48. The main shaft 43, the transmission gears 44, the drive shaft 45, the transmission gears 46, the shift cam 47, and the shift fork 48 constitute one embodiment of a transmission 50 known as a dog clutch transmission.

Regarding gear shifting in the dog clutch transmission, it is known that a shift operation can be conducted more reliably when a dog insert operation and a clutch disengagement operation are conducted at specified timings. Moreover, in order to reliably activate the clutch and the transmission at such timings, it is desirable that positions of the clutch and the transmission be definite when shift control starts. Since the positions of the clutch and transmission are indefinite during the shift operation, it is not desirable that the shift control start during the shift operation.

Figure 4:
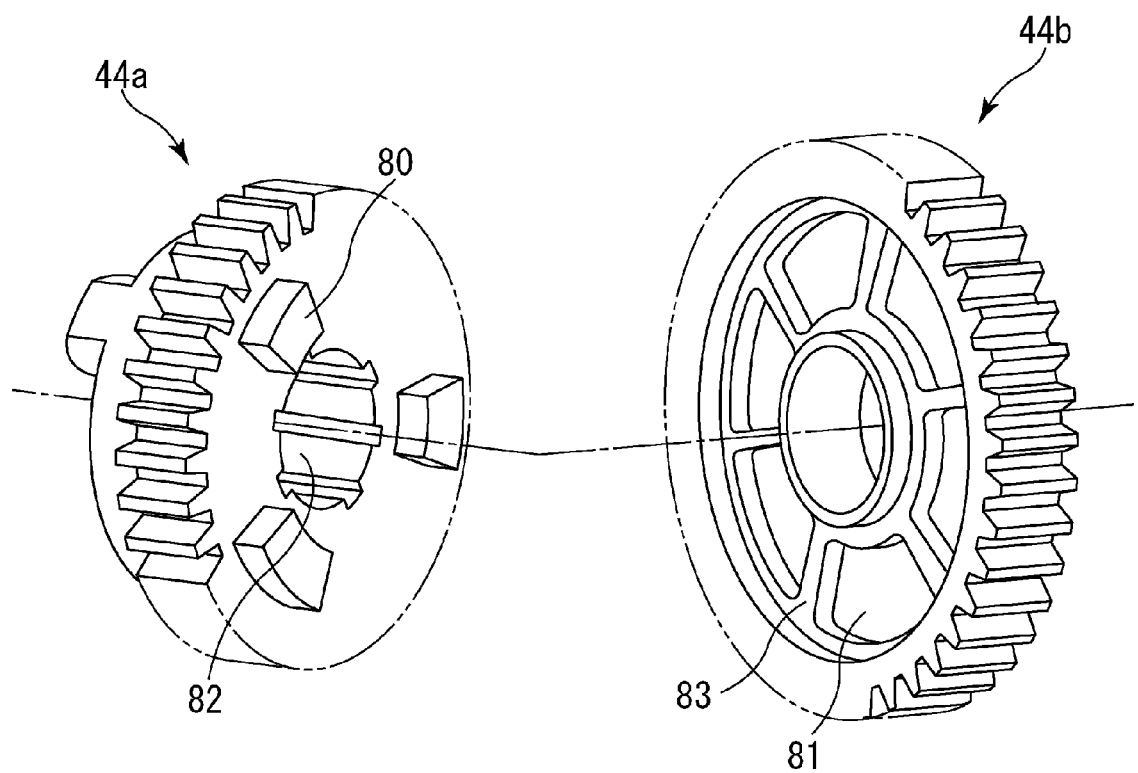
FIG. 4 is a diagram illustrating a structure of a transmission gear.

FIG. 4 is a diagram showing a structure of one of the transmission gears 44. The transmission gear 44 includes a first gear 44a with dogs 80 on its axial end face, and a second gear 44b with recesses 81 on its axial end face. The first gear 44a is fitted onto the main shaft 43 extending through a splined hole 82 such that the first gear 44a does not rotate relative to the main shaft 43 but can be moved in the direction along the axis of main shaft 43. The second gear 44b is mounted on the main shaft 43 such that the second gear 44b can rotate freely.

The first gear 44a can be moved in the axis direction using the shift fork 48. When the dogs 80 on the first gear 44a do not mesh with the recesses 81 in the second gear 44b, the power that is input to the main shaft 43 is not transmitted to the second gear 44b, because the first gear 44a and the second gear 44b rotate freely relative to each other. When the dogs 80 on the first gear 44a are inserted into the recesses 81 in the second gear 44b, the first gear 44a and the second gear 44b rotate together so that the power that is input to the main shaft 43 is transmitted to the drive shaft 45 through the second gear 44b and to the transmission gear 46 that meshes with the second gear 44b.

The main shaft 43 and the drive shaft 45 are provided with respective transmission gears 44 and 46, each of which include gears similar to the first gear 44a and the second gear 44b. The transmission 50 changes the reduction ratio at which the power is transmitted from the main shaft 43 to the drive shaft 45 by appropriately selecting a combination of the transmission gear 44 and the transmission gear 46 whose dogs 80 and recesses 81 mesh with each other.

When a dog insert operation is attempted, the first gear 44a is moved in the axis direction toward the second gear 44b, the dogs 80 may contact an axial end face 83 of the second gear 44b instead of contacting the recesses 81. In this case, if the first gear 44a and the second gear 44b rotate at the same speed, the shift operation is disabled. This condition is called a dog contact state. In order to prevent a dog contact state, and reliably conduct the shift operation, a torque should be applied to one of the first gears 44a and the second gear 44b so that the first and second gears rotate relative to each other in sliding contact. Specifically, the torque can be provided to the first gear 44a through the main shaft 43 by conducting the dog insert operation and the disengagement operation of the clutch at specified timings so that the dogs are inserted while the clutch 42 is partially engaged.

The power transmitted to the drive shaft 45 is transmitted to the rear wheel 12 through a well-known power transmission mechanism (not shown), such as a chain mechanism, a belt mechanism, or a shaft drive mechanism so as to drive the motorcycle 1. The ratio between the rotation speed of the drive shaft 45 and the rear wheel 12, which is generated by the power transmission mechanism, is known as a secondary reduction ratio. A drive shaft tachometer 49 is attached to the end of the drive shaft 45 to measure the speed of the drive shaft 45.

In the transmission mechanism 40 of the embodiment shown in FIG. 3, a clutch actuator 51 and a shift actuator 52 actuate the clutch 42 and the transmission 50, respectively. The clutch actuator 51 thrusts or retracts a rod 53 so as to disengage, engage, or partially engage the clutch 42. A clutch actuator position detector 54, for detecting the position of the clutch actuator, is attached to the clutch actuator 51. The shift actuator 52 shifts a gear in the transmission 50 up or down by rotating a shift arm 55 and thereby rotating the shift cam 47 by a certain angle at a time. A potentiometer 56 for detecting a rotation angle of the shift actuator 52 is attached to the shift actuator 52. A gear position detector 57 for detecting the present gear position is attached to an end of the shift cam 47. A known electric motor such as a servomotor or a stepping motor, or a known actuator such as a hydraulic motor or a hydraulic cylinder may be used as the clutch actuator 51 and the shift actuator 52. In FIG. 3, the clutch actuator 51 is directly connected to the rod 53, and the shift actuator 52 is directly connected to the shift arm 55. However, the clutch actuator 51 and the rod 53, and the shift actuator and the shift arm 55, may be interconnected with a gear mechanism or a link mechanism as necessary. A rotary encoder, a linear encoder, or other device for position detection, can be used as the clutch actuator position detector 54. A known sensor such as a potentiometer, an optoelectronic switch, or a proximity switch can be used as the gear position detector 57.

Figure 5:
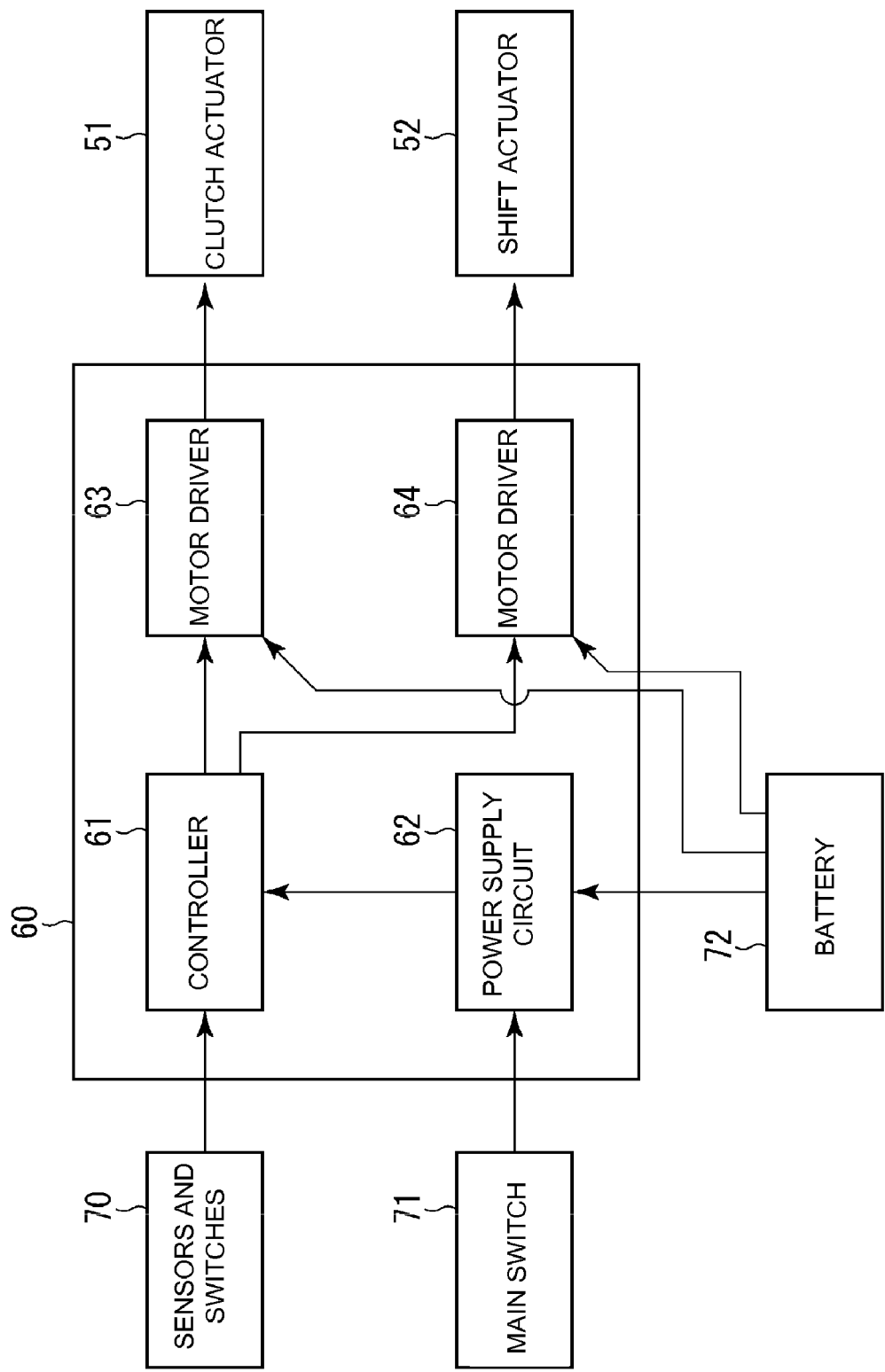
FIG. 5 illustrates a block diagram of a control system.

FIG. 5 is a block diagram of a control system of the motorcycle 1. Sensors and switches 70, a main switch 71 that is linked to the key switch, a battery 72 for supplying power to a control device 60, the clutch actuator 51, and the shift actuator 52 are connected to the control device 60.

The control device 60 includes a controller 61, a power supply circuit 62, and motor drivers 63 and 64. The controller 61 includes a known computer such as a digital signal processor (DSP) or a micro controller. Various data that indicates the states of various parts of the motorcycle 1, and the commands issued by a rider, are input from the sensors and switches 70 to the controller 61. On the basis of the data, the controller 61 controls the transmission mechanism 40 by sending signals to the motor drivers 63 and 64 and thereby actuating the clutch actuator 51 and the shift actuator 52. A program for operating the controller 61 is provided in nonvolatile memory such as ROM or flash memory in the controller 61. The power supply circuit 62, which is linked to the main switch 71, adjusts voltage, current, and other electrical properties, of the electric power that is supplied from the battery 72, and supplies the electric power to the controller 61. The motor driver 63 receives the electric power from the battery 72 and actuates the clutch actuator 51 in accordance with a signal sent from the controller 61. Similarly, the motor driver 64 actuates the shift actuator 52.

Figure 6:
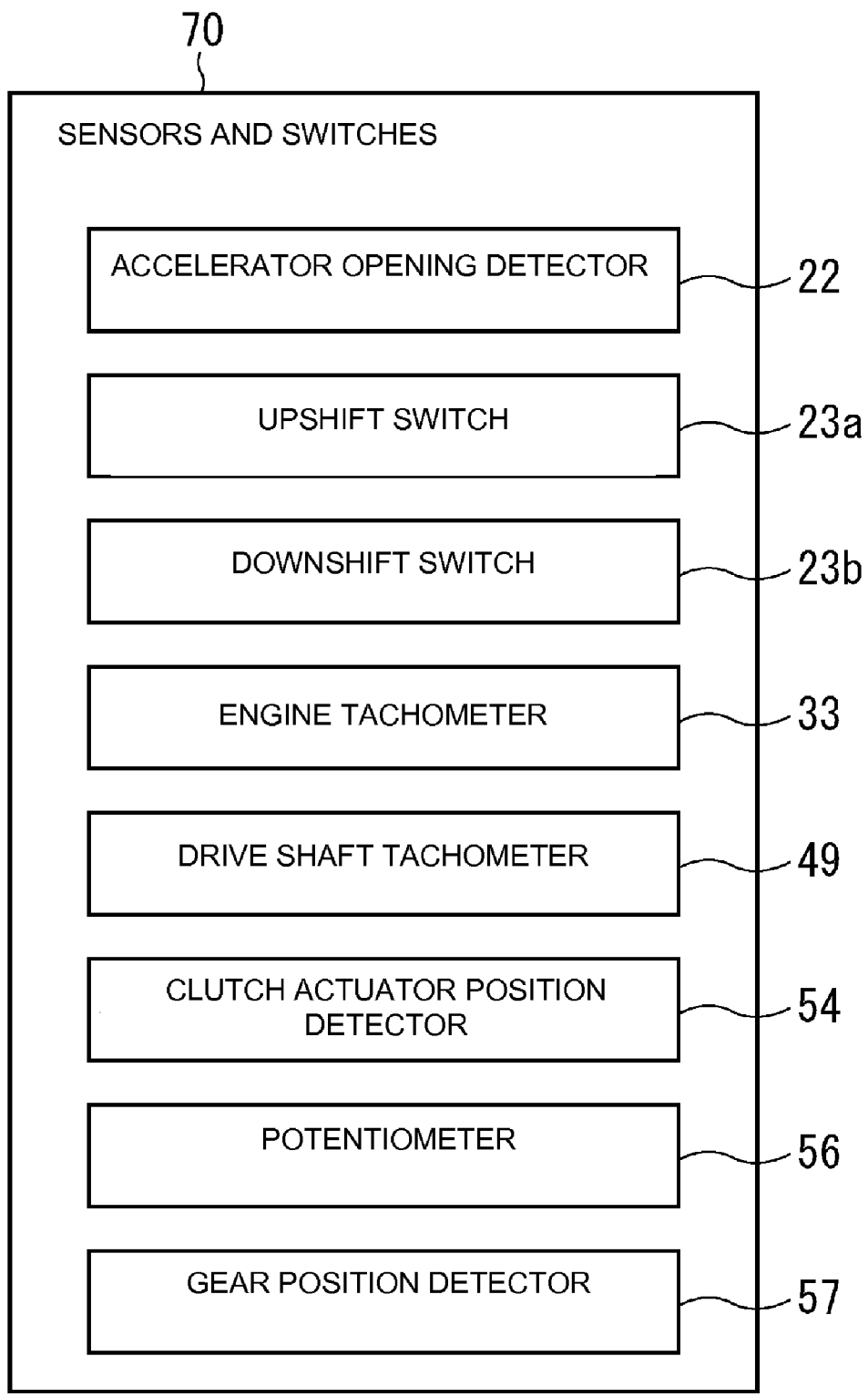
FIG. 6 is a diagram illustrating a structure of sensors and switches.

FIG. 6 is a diagram illustrating a structure of the sensors and switches 70 connected to the control device 60 in one embodiment. As shown, the sensors and switches 70 include the accelerator opening detector 22, the upshift switch 23a, the downshift switch 23b, the engine tachometer 33, the drive shaft tachometer 49, the clutch actuator position detector 54, the potentiometer 56, and the gear position detector 57. Data obtained from the sensors and switches 70 are input to the controller 61 as required.

Hereinafter, control for conducting a shift operation of a running motorcycle 1, having the above-described structure, is described in detail.

Figure 7:
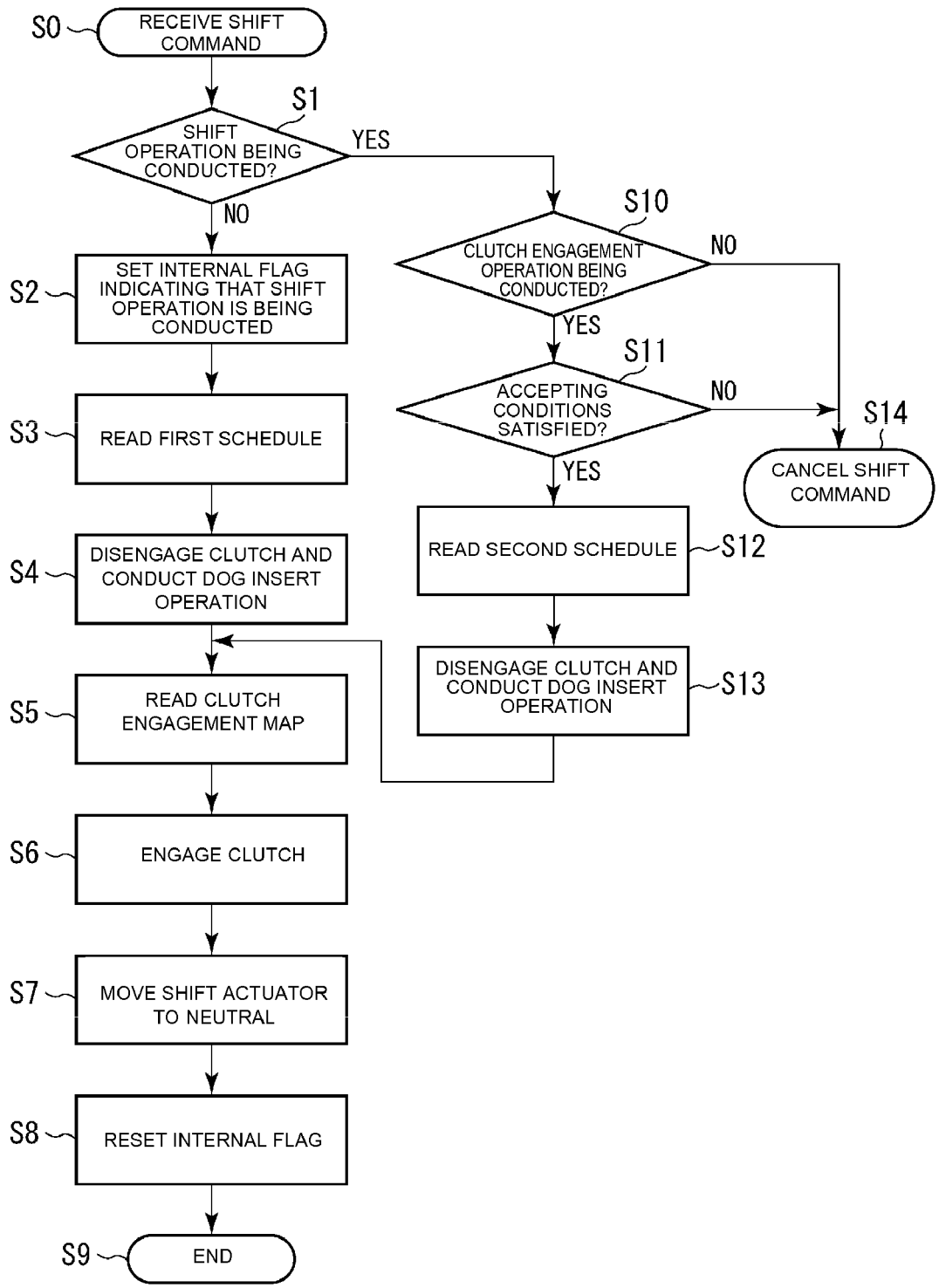
FIG. 7 is a flowchart illustrating a control algorithm executed by a control device when a rider inputs a shift command while the motorcycle is running.

FIG. 7 is a flowchart showing an algorithm for control that is conducted by the control device 60 when a rider inputs a shift command while the motorcycle 1 is running. With reference to the flowchart, the control device 60 detects that the rider pressed the upshift switch 23a or the downshift switch 23b and receives a shift command (step S0). A shift command to shift a gear to a nonexistent gear position, such as a downshift command from the neutral position or an upshift command from the top gear, is rejected.

Upon receiving the shift command, the control device 60 determines the timing at which the shift command was issued and the state of the motorcycle 1 at that time. Specifically, the control device 60 determines whether a shift operation is being conducted in the motorcycle 1 at that time (step S1) and whether an engagement operation of the clutch 42 is being conducted (step S10). In one preferred embodiment, the control device 60 determines whether a shift operation is being conducted in the motorcycle 1 at that time by checking a value of an internal flag stored in the control device 60. The value of the internal flag is set so as to indicate whether a shift operation is being conducted in the motorcycle 1. Methods to determine the timing of the shift command are not limited to the use of an internal flag. For example, a time elapsed since the shift operation was started may be used, or an operating state of the shift arm may be checked.

If a shift operation is being conducted, the control device 60 determines whether an engagement operation of the clutch 42 is being conducted by checking the content of the signal sent from the controller 61 to the motor driver 63. In a program for making these checks, a determining unit for determining the timing at which the shift command was issued is implemented in software.

If at the time a shift command is received, a shift operation is not being conducted in the motorcycle 1, the control device 60 proceeds to step S2 and changes the value of the internal flag to a value indicating that a shift operation is being conducted. Then, the control device 60 reads a first schedule for conducting a disengagement operation of the clutch 42 and activation of the transmission 50 from memory (step S3). The memory, which is not shown, could be ROM, EPROM, Flash or any other type of data storage device. The first schedule includes data such as timings at which the clutch 42 and the transmission 50 are to be activated, conditions for starting the operation, and speeds of the operation.

In step S4, the clutch 42 is disengaged and the transmission 50 is activated in accordance with the first schedule so as to shift up or down a gear. At this time, because a gear is shifted up or down while the clutch 42 is being moved to the disengaged position as described below, the dog insert operation in the transmission 50 is conducted while the clutch 42 is partially engaged.

When the clutch 42 is disengaged and the dog insert operation in the transmission 50 is completed, the control device 60 reads a clutch engagement map 90 from memory (not shown) such as ROM (step S5).

Figure 8:
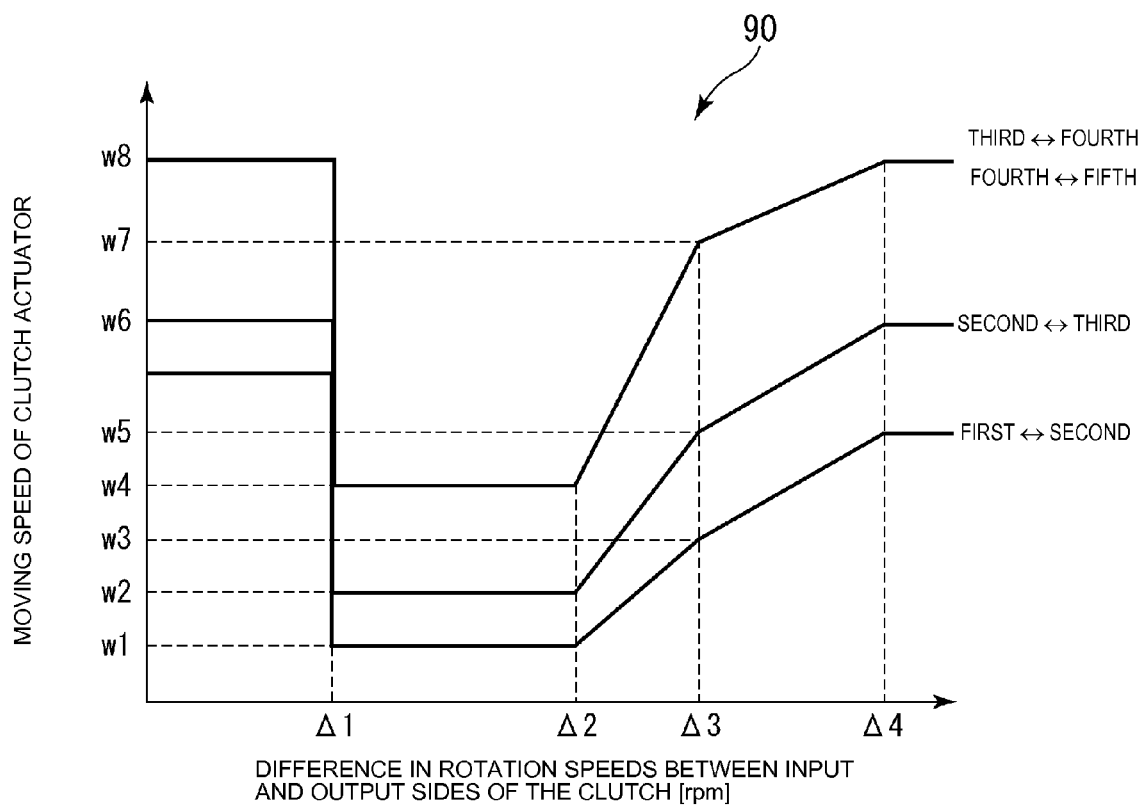
FIG. 8 is a graph illustrating a clutch engagement map.

FIG. 8 is a graph showing the clutch engagement map 90. The horizontal axis represents a difference in rotation speed between the input and output sides of the clutch 42, and the vertical axis represents a moving speed of the clutch actuator 51. For each gear position to be shifted to, the relationship between the difference in the rotation speeds and the moving speed of the clutch actuator is shown with a line.

The control device 60 engages the clutch 42 by driving the clutch actuator 51 with the motor driver 63 on the basis of the moving speed of the clutch actuator 51 obtained from the clutch engagement map 90 in accordance with the difference in rotation speed between the input and output sides of the clutch 42 (step S6). The rotation speed of the input side of the clutch 42 is calculated by multiplying the primary reduction ratio and the output of the engine tachometer 33, which is data related to the rotation speed of the input side of the clutch 42. The rotation speed of the output side of the clutch 42 is calculated by multiplying the present gear ratio of the transmission 50 and the output data of the drive shaft tachometer 49 provided for detecting a vehicle speed, which is data related to the rotation speed of the output side of the clutch 42. The present gear ratio of the transmission 50 can be obtained by detecting a gear position with the gear position detector 57.

In the above-described steps S3 to S6, a first shift operation according to the first schedule is conducted. During the first shift operation, the control device 60 serves as a shift control unit that conducts the disengagement and engagement operations of the clutch 42 and the shift operation including the dog insert operation of the transmission 50 in accordance with the shift command.

When the engagement of the clutch 42 is completed, the control device 60 returns the shift arm 55 to the neutral position (step S7), changes the value of the internal flag to a value indicating that a shift operation is not being conducted (step S8), and terminates the control for the shift operation (step S9).

Figure 9:
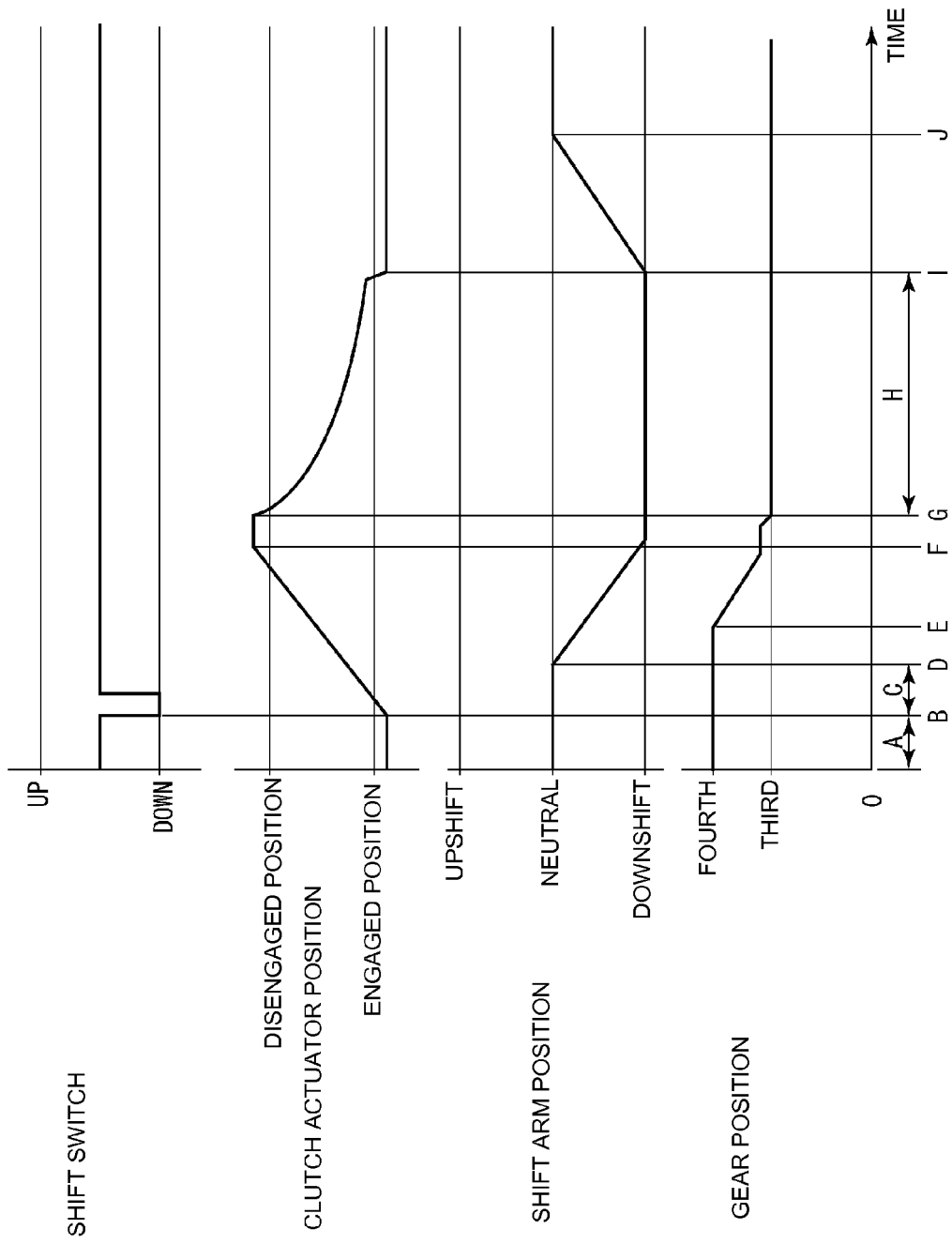
FIG. 9 is a graph illustrating the behavior of the motorcycle during a first shift operation.

FIG. 9 is a graph showing the behavior of the motorcycle 1 during the first shift operation. Lines in sections of the graph show, from top to bottom, an input to the shift switch 23, a position of the clutch actuator, a position of the shift arm, and a change of the gear position in the transmission 50. The horizontal axis represents time for all sections of the graph.

Looking first at the top line on the graph representing the input to the shift switch 23, the middle position in the graph shows a state in which there is no input, the "UP" position shows a state in which the upshift switch 23a is pressed, and the "DOWN" position shows a state in which the downshift switch 23b is pressed.

Examining next the second line down from the top on the graph regarding the clutch actuator position, the area above the line labeled "disengaged position" in the graph shows a state in which the clutch 42 is disengaged, the area below the line labeled "engaged position" shows a state in which the clutch 42 is engaged, and the area between these positions shows a state in which the clutch 42 is partially engaged.

Regarding the third line down in the graph labeled shift arm position, the "NEUTRAL" position in the graph shows a state in which the shift arm 55 is in the neutral position. The "UPSHIFT" position shows a state in which the shift cam 47 is rotated by the shift arm 55 by a certain angle in the upshift direction. The "DOWNSHIFT" position shows a state in which the shift cam 47 is rotated by the shift arm 55 by a certain angle in the downshift direction.

Lastly, the bottom line of the graph labeled gear position shows a gear position of the transmission 50 corresponding to a rotation angle of the shift cam 47.

Described below is a case in which a rider presses the downshift switch 23b while the motorcycle 1 is cruising in the fourth gear. Note that similar control is exercised when a rider presses the upshift switch 23a.

In FIG. 9, the area denoted by A represents a state in which the motorcycle 1 is cruising. At this time, as shown in FIG. 9, the shift switch 23 is not pressed, the clutch actuator 51 is in the engaged position, the shift arm 55 is in the neutral position, and the gear position is in fourth gear. When a rider presses the downshift switch 23b, B in FIG. 9, the control device 60 determines whether a shift operation is being conducted in the motorcycle 1. Since the motorcycle 1 is cruising in this case, the control device 60 determines that a shift operation is not being conducted. Then, following the above algorithm illustrated in FIG. 7, the value of the internal flag is changed to a value indicating that a shift operation is being conducted, and a first schedule is read.

The first schedule includes a timing and speed at which the clutch 42 is caused to start to move toward the disengaged position, and a timing and speed at which the shift arm 55 is caused to start to rotate in an upshift or a downshift direction. As shown in FIG. 9, the clutch actuator 51 is caused to start to move as soon as the downshift switch 23b is pressed. Then, after a predetermined period denoted by C in FIG. 9, the shift arm 55 starts to rotate, D in FIG. 9, so as to start to rotate the shift cam 47, E in FIG. 9, and change the gear position of the transmission 50 from fourth to third. At this time, a pair of the transmission gears 44 and 46 in the transmission 50 that were meshed with each other to provide the fourth gear ratio become unmeshed. Subsequently, a pair of the transmission gears 44 and 46 in the transmission 50 become meshed with each other to provide the third gear ratio. The meshing of the transmission gears is effectuated when a dog insert operation is conducted. Dogs 80 on a first gear 44*a* are inserted into the recesses 81 on a second gear 44*b*. The dog insert operation occurs on a set of gears 44 on the main shaft 43 and on a set of gears 46 on the drive shaft 45 respectively so that the transmission gears 44 and 46 are meshed together. The length of the predetermined period, C in FIG. 9, is set such that the dog insert operation is conducted while the clutch 42 is partially engaged.

When the clutch actuator position detector 54 detects that the clutch actuator 51 has reached the disengaged position, F in FIG. 9, and the gear position detector 57 detects that the gear position has been changed to third gear, G in FIG. 9, the control device 60 reads the clutch engagement map 90.

In the area denoted by H, the control device 60 reads output from the engine tachometer 33 and the drive shaft tachometer 49 as necessary, calculates the difference between the rotation speeds of the input and output sides of the clutch 42, and moves the clutch actuator 51 in accordance with the moving speed obtained from the clutch engagement map 90.

When it is detected that the clutch actuator 51 is in an engaged position, I in FIG. 9, the control device 60 returns the shift arm to the neutral position, J in FIG. 9, changes the value of the internal flag to a value indicating that a shift operation is not being conducted, switches to a cruising mode, and terminates the shift operation.

Referring back to FIG. 7, an example of when step SI determines that a shift operation is being conducted in the motorcycle 1 will now be described. When the internal flag indicates that a shift operation is being conducted in the motorcycle 1, the control device 60 proceeds to step S10 to determine whether the clutch 42 is in an engagement operation.

If the clutch 42 is not in an engagement operation, the control device 60 rejects and cancels a new shift command (step S14) and continues the present shift operation. In this case, a buzzer or a display in the indicator 24, for example, may indicate to the rider that the shift command is canceled. If the clutch 42 is in an engagement operation, the control device 60 proceeds to step S11 and determines whether to accept the shift command that is input during the shift operation.

If the rider inputs a new shift command at a time when the present shift operation has almost finished, the control device 60 accepts the shift command so as to respond to the shift command quickly issued by the rider. By accepting the new shift command, which was input at a time when the rider felt that the present shift operation had finished but in fact the control had not yet finished, instead of cancelling it, the rider is provided with a natural, comfortable, and responsive driving sensation. On the other hand, if the rider inputs a new shift command at a time when the present shift operation is not almost finished, it is likely that the shift command is an improper operation. A shift operation at such timing would damage a comfortable driving sensation. In such a case, the control device 60 rejects and cancels the new shift command (step S14).

Specifically, the timing can be determined by applying the condition that (1) the difference in rotation speed between the input and output sides of the clutch 42 is equal to or less than a predetermined value. This is because, if the difference in rotation speed between the input and output sides of the clutch 42 is equal to or less than a predetermined value of, for example, 100 rpm, the shift operation is almost finished. Moreover, the following conditions may be added: (2) the clutch actuator position is situated closer to the engaged position than a set position, and (3) a predetermined period elapses while the conditions (1) and (2) are satisfied. The predetermined period may be set at, for example, 20 ms. Obviously, the predetermined value and the predetermined period may be appropriately set such that a comfortable driving sensation is provided. The program for the determination includes a determining unit that is implemented in software. The determining unit determines whether the difference in rotation speed between the input and output sides of the clutch 42 is less than a predetermined value on the basis of the data related to the rotation speeds of the input and output sides of the clutch 42.

When the control device 60 determines to accept the shift command that is input during the shift operation, the control device 60 reads a second schedule for disengaging the clutch 42 and activating the transmission 50 from memory (not shown) such as ROM, step S12 in FIG. 7. As in the first schedule, the second schedule includes data such as timings at which the clutch 42 and the transmission 50 are to be activated, conditions for starting the operation, and speeds of the operation.

In step S13, the engagement operation of the clutch 42 is interrupted, and the clutch 42 and the transmission 50 are activated in accordance with the second schedule so as to shift up or down a gear. As describe below, the second schedule differs from the first schedule in that, even when a new shift operation is started during the present shift operation, the dog insert operation of the transmission 50 is conducted while the clutch 42 is partially engaged by shifting up or down a gear while the clutch actuator 51 is moved toward the disengaged position.

When the clutch 42 is disengaged and the dog insert operation of the transmission 50 is finished, the flow proceeds to step S5. Subsequent steps are as described above. On the basis of steps S12, S13, S5, and S6 described above, the second shift operation according to the second schedule is conducted.

The second shift operation is conducted, not only when a new shift command is input during the first shift operation, but also when a new shift command is input during the second shift operation.

Figure 10:
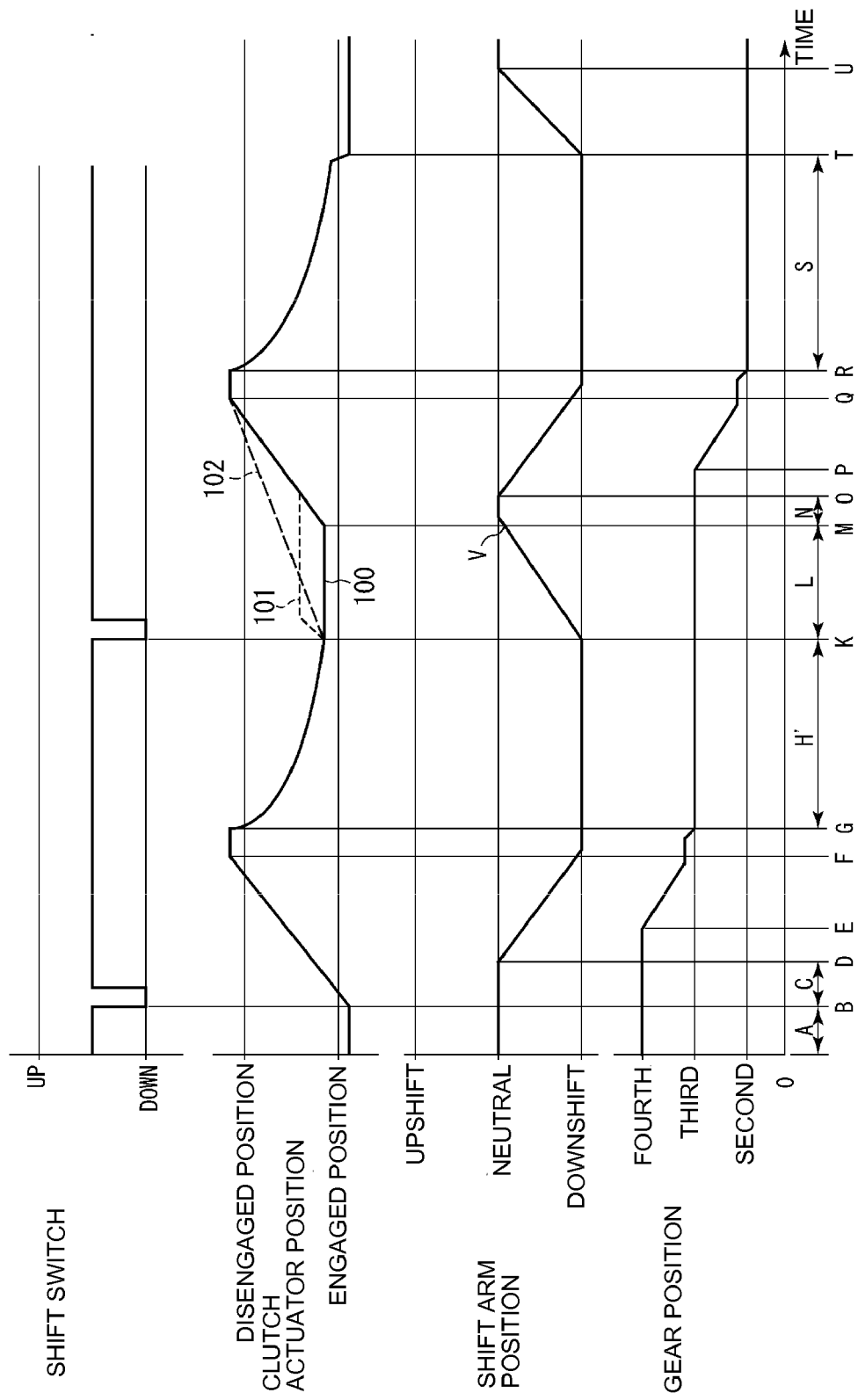
FIG. 10 is a graph illustrating the behavior of the motorcycle in a first example of a second shift operation.

FIG. 10 is a graph showing behavior of the motorcycle 1 in a first example of the second shift operation. As in FIG. 9, lines in sections of the graph show, from top to bottom, an input to the shift switch 23, a position of the clutch actuator, a position of the shift arm, and a change of the gear position in the transmission 50. The horizontal axis represents time for all sections of the graph.

An example in which a rider pressed the downshift switch 23*b* during the first shift operation described above with reference to FIG. 9 is illustrated in FIG. 10 and described here. The parts denoted by A to G in FIG. 10 are the same as in FIG. 9 as described above. The area denoted by H' in FIG. 10 represents that the control device 60 performs control so as to move and engage the clutch actuator 51 on the basis of the clutch engagement map 90.

When the downshift switch 23*b* is pressed again, K in FIG. 10, the control device 60 determines whether to accept the shift command that is input during the present shift operation, step S11 in FIG. 7. In this case, because the difference in speed between the input and output sides of the clutch 42 is equal to or less than a predetermined value, as an example 100 rpm, the shift command is accepted and the second schedule is read, Step S12 in FIG. 7.

The second schedule includes timing and speed at which the shift arm 55 is caused to start to rotate toward the neutral position, timing and speed at which the clutch actuator 51 is caused to start to move toward the disengaged position, and timing and speed at which the shift arm 55 is caused to start to rotate in the upshift or downshift direction. At the position shown by K in FIG. 10, the shift arm 55 is in the downshift position. In the second schedule, the shift arm 55 is first caused to start to move toward the neutral position, while the clutch actuator position is maintained, numeral 100 in FIG. 10. After a predetermined period L in FIG. 10, the clutch actuator 51 starts to move in a disengagement direction, M in FIG. 10. After a predetermined period N, the shift arm 55 starts rotating, O in FIG. 10, thereby rotating the shift cam 47, P in FIG. 10, and changing the reduction ratio of the transmission 50 from third to second. By delaying the movement of the clutch actuator 51 in the disengagement direction by the predetermined period L as shown in FIG. 10, the dog insert operation is conducted while the clutch 42 is partially engaged, and in particular, while the clutch 42 is moving in the disengagement direction in a partially engaged state. The predetermined periods L and N may be set appropriately such that the dog insert operation is conducted reliably.

Then, when the clutch actuator position detector 54 detects that the clutch actuator 51 has reached the disengaged position, Q in FIG. 10, and the gear position detector 57 detects that the gear position has been changed to second, R in FIG. 10, the control device 60 reads the clutch engagement map 90 and moves the clutch actuator 51 in accordance with the map, area S in FIG. 10.

When it is detected that the clutch actuator 51 has reached the engaged position, T in FIG. 10, the control device 60 returns the shift arm to the neutral position, U in FIG. 10, changes the value of the internal flag to a value indicating that a shift operation is not being conducted, and switches to a cruising mode, and terminates the shift operation.

In the above description, the movement of the clutch actuator 51 in the disengagement direction was delayed by the predetermined period L. Alternatively, the movement of the clutch actuator 51 in the disengagement direction may be delayed until it is detected that the shift arm 55 has reached a predetermined position. That is, the clutch actuator position may be maintained at the present position until the shift arm reaches the point V in FIG. 10. The position of the shift arm 55 can be obtained from the output value of the potentiometer 56 attached to the shift actuator 52.

A method for delaying the movement of the clutch actuator 51 in the disengagement direction is not limited to the method of maintaining the clutch actuator position. Alternatively, as shown by numeral 101 in FIG. 10, the clutch actuator 51 may be moved to a predetermined position after accepting the shift command, and then moved in the disengagement direction after a predetermined period. As a further alternative, as shown by numeral 102 in FIG. 10, the dog insert operation may be conducted while the clutch 42 is moved in the disengagement direction in a partially engaged state by moving the clutch actuator 51 slower than in the first schedule.

Figure 11:
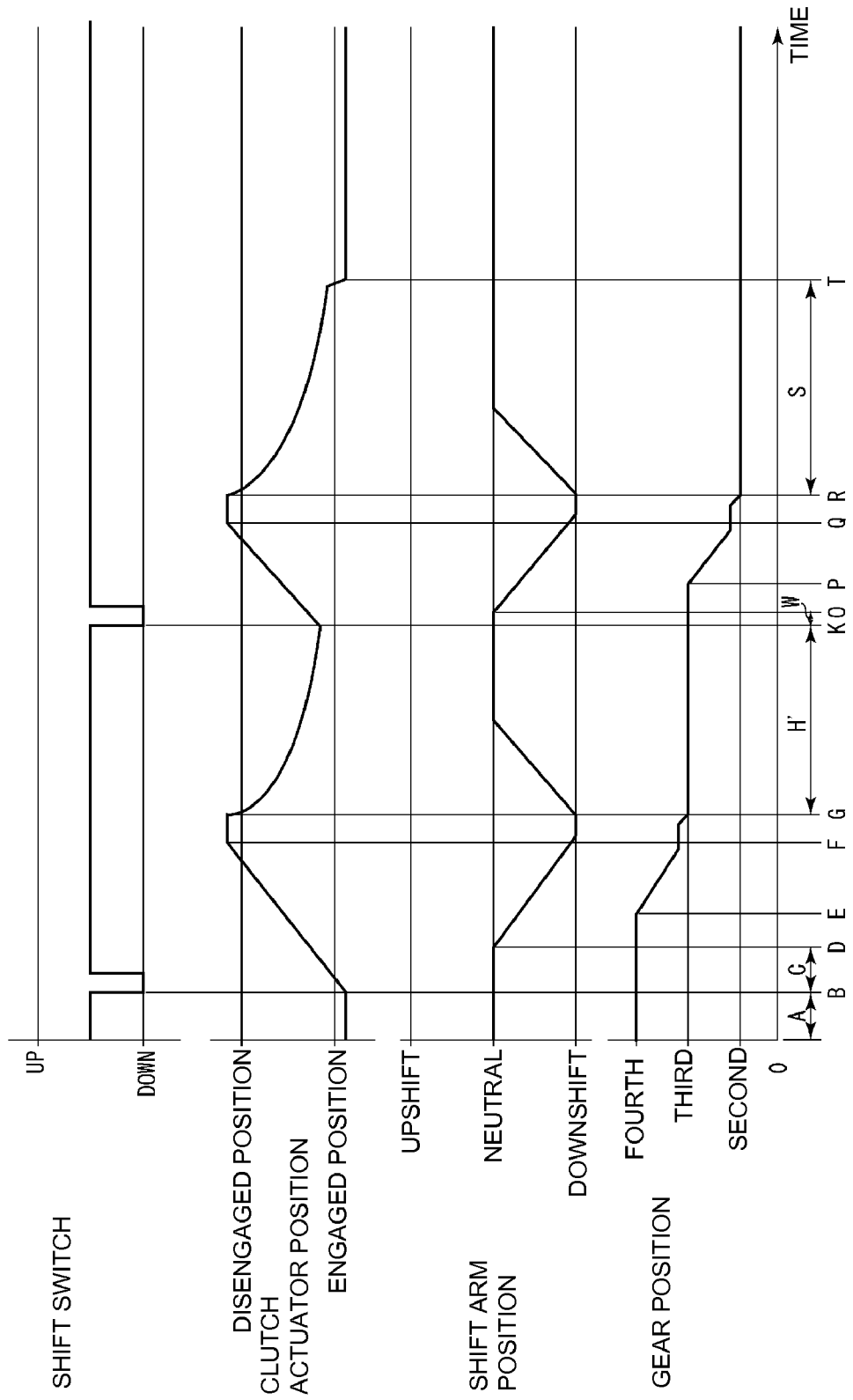
FIG. 11 is a graph illustrating the behavior of the motorcycle in a second example of a second shift operation.

FIG. 11 is a graph showing behavior of the motorcycle 1 in a second example of the second shift operation. As in FIGS. 9 and 10, lines in sections of the graph show, from top to bottom, an input to the shift switch 23, a position of the clutch actuator, a position of the shift arm, and a change of the gear position in the transmission 50. The horizontal axis represents time for all the sections. In the following description, like numerals denote like parts in the above-described first example described in FIG. 10. Overlapping descriptions are omitted.

This example differs from the first example in that, when it is detected that the gear position has been changed to third gear at time G in FIG. 11, the shift arm is immediately controlled and returned to the neutral position. Therefore, by the time when the control device 60 accepts an additional shift command during the first shift operation at time K in FIG. 11, the shift arm 55 is already returned to the neutral position.

In the second schedule in this example, the clutch actuator 51 is immediately caused to start to move, because it is not necessary that the movement of the clutch actuator 51 in the disengagement direction be delayed so as to wait until the shift arm 55 returns to the neutral position, as in the first example. Then, since the clutch actuator 51 starts to move the clutch 42 from the partially engaged position toward the disengaged position, the disengagement operation by the clutch actuator 51 is conducted earlier than in the first schedule in which the clutch 42 is caused to start to move from the engaged position toward the disengaged position.

Therefore, a predetermined period W from time K to time O in FIG. 11, at which time the shift arm 55 begins to rotate, is shorter than the predetermined period C in the first schedule. Therefore, the dog insert operation in the transmission 50 in the second schedule is started earlier than the dog insert operation of the transmission 50 in the first schedule. The length of the predetermined period W may be appropriately set such that the dog insert operation is conducted reliably. Alternatively, the length of W may be set in accordance with the output value of the clutch actuator position detector 54 that detects the position of the clutch actuator 51 at time K. The nearer the clutch actuator 51 is to the disengaged position at time K, the shorter the predetermined period W; the nearer the position of the clutch actuator 51 to the engaged position at time K, the longer is the predetermined period W.

The shift cam 47 starts rotating with the rotation and the movement of the shift arm 55, P in FIG. 11, so that the gear ratio of the transmission 50 is changed from third to second. When the clutch actuator position detector 54 detects that the clutch actuator 51 has reached the disengaged position, Q in FIG. 11, and the gear position detector 57 detects that the gear position is changed to second, R in FIG. 11, the control device 60 moves the shift arm 55 to the neutral position and reads the clutch engagement map 90. According to the clutch engagement map 90, the control device 60 moves the clutch actuator 51, area S in FIG. 11.

When it is detected that the clutch actuator 51 is at the engaged position, T in FIG. 11, the control device 60 changes the internal flag to a value indicating that a shift operation is not being conducted, switches to the cruising mode, and terminates the shift operation.

Although it is assumed in the above description that a rider manually issues a shift command, a computer such as the control device 60 may issue a shift command by automatic control.

As heretofore described, with the control device and method for the transmission mechanism of the motor vehicle and the motor vehicle according to the present invention, in the motor vehicle equipped with a clutch actuated by an actuator such as a motor and a dog clutch transmission, an additional shift command can be accepted during a shift operation, thereby enabling control for a responsive shift operation.

What is claimed is:

1. A device for controlling a transmission mechanism of a motor vehicle, the transmission mechanism including a transmission having a clutch, gears each having a dog, and gears each having a recess into which the dog is inserted, the clutch and the gears being actuated by respective actuators, wherein a shift operation is conducted by conducting a dog insert operation in which a specified one of the dogs is inserted into a specified one of the recesses, the device comprising:

- a shift command receiving unit for receiving a shift command;
- a shift control unit for conducting disengagement and engagement operations of the clutch and the shift operation including the dog insert operation of the transmission in accordance with the shift command;
- a shift command timing determining unit for determining timing at which the shift command was issued;
- a first schedule for use by the shift control unit in a first shift operation when the shift command timing determining unit determines that the shift command was issued at a time when the shift operation was not being conducted, wherein the disengagement operation of the clutch and the dog insert operation of the transmission are conducted in accordance with the first schedule; and
- a second schedule that is different from the first schedule for use by the shift control unit in a second shift operation when the shift command timing determining unit determines that the shift command was issued at a time when the shift operation and the engagement operation of the clutch were being conducted, wherein the shift control unit interrupts the engagement operation of the clutch and conducts the disengagement operation of the clutch and the dog insert operation of the transmission in accordance with the second schedule.

2. The device for controlling a transmission mechanism according to claim 1, the device further comprising
- a rotation speed difference determining unit for determining whether a difference in rotation speed between an input side of the clutch and an output side of the clutch is less than a predetermined value on the basis of data related to the rotation speeds of the input and output sides of the clutch,
- wherein the shift control unit conducts the second shift operation when the rotation speed difference determining unit determines that the difference in rotation speed between the input and output sides of the clutch is less than the predetermined value.

3. The device for controlling a transmission mechanism according to claim 1,
- wherein the second schedule prescribes that the disengagement operation of the clutch is started after a lapse of a specified period.

4. The device for controlling a transmission mechanism according to claim 1,
- wherein the second schedule prescribes that the disengagement operation of the clutch is started after the clutch is moved to a specified position and a subsequent lapse of a specified period.

5. The device for controlling a transmission mechanism according to claim 1,
- wherein the second schedule prescribes that the disengagement operation of the clutch is conducted at a speed lower than a speed of the disengagement operation of the clutch prescribed in the first schedule.

6. The device for controlling a transmission mechanism according to claim 3,
- wherein the specified period in the second schedule is determined in advance.

7. The device for controlling a transmission mechanism according to claim 4,
- wherein the specified period in the second schedule is determined in advance.

8. The device for controlling a transmission mechanism according to claim 3, the device further comprising
- a detection unit for detecting a position of the actuator that actuates the transmission,
- wherein the specified period in the second schedule elapses when the detection unit detects that the actuator is in a specified position.

9. The device for controlling a transmission mechanism according to claim 4, the device further comprising
- a detection unit for detecting a position of the actuator that actuates the transmission,
- wherein the specified period in the second schedule elapses when the detection unit detects that the actuator is in a specified position.

10. The device for controlling a transmission mechanism according to claim 1,
- wherein the dog insert operation of the transmission according to the second schedule is started earlier than the dog insert operation of the transmission according to the first schedule.

11. The device for controlling a transmission mechanism according to claim 1, wherein the shift command is input by a rider.

12. A vehicle including the device for controlling a transmission mechanism according to claim 1.

13. A method for controlling a transmission mechanism of a motor vehicle, the transmission mechanism including a transmission having a clutch, gears each having a dog, and gears each having a recess into which the dog is inserted, the clutch and the gears being actuated by respective actuators, wherein a shift operation is conducted by inserting a specified one of the dogs into a specified one of the recesses, the method comprising the steps of:
- a. determining the timing at which a shift command was issued; and
- b. conducting disengagement and engagement operations of the clutch and the shift operation including the dog insert operation of the transmission in accordance with the shift command,
- wherein when it is determined during the determining step that the shift command was issued at a timing at which the shift operation was not being conducted, the disengagement operation of the clutch and the dog insert operation of the transmission in the conducting step are performed in accordance with a first schedule and then the engagement operation of the clutch is conducted, and
- when it is determined during the determining step that the shift command was issued at a timing at which the shift operation and the engagement operation of the clutch were being conducted, the engagement operation of the clutch is interrupted and the disengagement operation of the clutch and the dog insert operation of the transmission in the conducting step are performed in accordance with a second schedule that is different from the first schedule and then the engagement operation of the clutch is conducted.

14. A method for controlling a transmission mechanism with a clutch when a shift command is received during a shift operation comprising the steps of:
- a. determining whether a shift operation is being conducted when a shift command is received;
- b. deciding whether to accept the shift command;
- c. reading a second schedule for controlling clutch actuator, wherein the second schedule is different from a first schedule used for controlling the clutch actuator when the determining step determines a shift operation is not being conducted, d. disengaging the clutch and engaging a new gear in the transmission in accordance with the second schedule; and e. engaging the clutch.

15. The method according to claim 14, wherein the deciding step decides whether to accept the shift command by comparing a difference of a rotation speed on an input side of the clutch and a rotational speed on an output side of the clutch to a predetermined value.

16. The method according to claim 14, wherein the deciding step decides whether to accept the shift command based on the proximity of the clutch actuator to the disengaged position.

17. The method according to claim 14, wherein the disengaging step is delayed for a specified period of time according to the second schedule.

18. The method according to claim 14, wherein the disengaging step is delayed until the clutch is moved to a specified position and a subsequent lapse of a specified period occurs according to the second schedule.

19. The method according to claim 14, wherein the second schedule prescribes that the disengagement step of the clutch is conducted at a speed lower than a speed of the disengagement step of the clutch prescribed in the first schedule.

20. A shift control device for controlling the shifting of gears in a transmission mechanism, the shift control device comprising:

a shift control unit;

a sensor input in communication with the shift control unit;

a clutch actuator in communication with the shift control unit, the clutch actuator having an engaged position and a disengaged position;

a shift actuator in communication with the shift control unit;

a first set of instructions for execution by the shift control unit to control operation of the shift actuator when the sensor input receives a shift command and the clutch actuator is in the engaged position; and a second set of instructions for execution by the shift control unit to control operation of the shift actuator when the sensor input receives a shift command and the clutch actuator is not in the engaged position.

21. The shift control device according to claim 20, wherein the second set of instructions delays the movement of the clutch actuator towards the disengaged position by a time value.

22. The shift control device according to claim 20, wherein the second set of instructions moves the clutch actuator to a predetermined position, and then moves the clutch actuator towards the disengaged position after a time value.

23. The shift control device according to claim 20, wherein the second set of instructions moves the clutch actuator towards a disengaged position at a slower speed than the first set of instructions.

24. The shift control device according to claim 20, further comprising a rotational speed difference determining unit wherein the second set of instructions is not executed by the shift control unit when the rotational speed difference determining unit determines that the difference in rotational speed between the input and output sides of a clutch is less than a predetermined value.

25. The shift control device according to claim 20, wherein the second set of instructions is not executed by the shift control unit when the clutch actuator position is situated closer to the engaged position than a predetermined position.

* * * * *